(12) United States Patent
Mano et al.

(10) Patent No.: US 10,109,832 B2
(45) Date of Patent: Oct. 23, 2018

(54) LAMINATED LITHIUM PRIMARY BATTERY

(71) Applicant: FDK Tottori Co., Ltd., Tottori (JP)

(72) Inventors: Tsukasa Mano, Tottori (JP); Yuya Iida, Tottori (JP); Akihiro Yamamoto, Tottori (JP); Ryuji Ito, Tottori (JP)

(73) Assignee: FDK Corporation, Tokyo (JP)

(*) Notice: Subject to any disclaimer, the term of this patent is extended or adjusted under 35 U.S.C. 154(b) by 63 days.

(21) Appl. No.: 15/014,167

(22) Filed: Feb. 3, 2016

(65) Prior Publication Data

US 2016/0226048 A1    Aug. 4, 2016

(30) Foreign Application Priority Data

Feb. 3, 2015  (JP) .................. 2015-019301

(51) Int. Cl.
| | |
|---|---|
| *H01M 2/16* | (2006.01) |
| *H01M 2/02* | (2006.01) |
| *H01M 6/02* | (2006.01) |
| *H01M 6/16* | (2006.01) |
| *H01M 4/38* | (2006.01) |

(52) U.S. Cl.
CPC ........... *H01M 2/1626* (2013.01); *H01M 6/16* (2013.01); *H01M 6/166* (2013.01); *H01M 6/164* (2013.01); *H01M 2220/30* (2013.01)

(58) Field of Classification Search
CPC .......... H01M 2/02; H01M 2/021; H01M 2/16; H01M 2/1626; H01M 4/38; H01M 4/382; H01M 6/02; H01M 6/16
See application file for complete search history.

(56) References Cited

U.S. PATENT DOCUMENTS

| | | | | |
|---|---|---|---|---|
| 9,166,250 B2* | 10/2015 | Katayama | ........... | H01M 2/1606 |
| 2006/0194103 A1* | 8/2006 | Otohata | ................ | H01G 9/016 |
| | | | | 429/185 |
| 2013/0136982 A1* | 5/2013 | Kamizono | ............ | H01M 4/466 |
| | | | | 429/188 |

(Continued)

OTHER PUBLICATIONS

Ichimura, Masahiro, "Internal Short Circuits in Lithium-ion Batteries and Safety Testing," NTT Facilities Research Institute Inc., 2007, [online] Internet <URL: https://www.ntt-fsoken.co.jp/research/pdf/2007_ichi.pdf>, accessed on Jan. 22, 2015.

*Primary Examiner* — Karie O'Neill Apicella
(74) *Attorney, Agent, or Firm* — Harness, Dickey & Pierce, P.L.C.

(57) ABSTRACT

A laminated lithium primary battery is provided which can prevent battery life deterioration caused by moisture penetration from outside and in which safety and increase of battery capacity both can be realized. A lithium primary battery 1, including: a sheet-like negative electrode 30 made of lithium; a sheet-like positive electrode 20; a sheet-like separator 40 made of cellulose; non-aqueous organic electrolytic solution; a jacket 11 made of laminate films (11a and 11b), an inside of the jacket is sealed by heat-sealing periphery of the laminate film stacked in an up-and-down direction; and an electrode assembly 10 in which the positive electrode 20 and the negative electrode 30 are stacked in the up-and-down direction having the separator 40 therebetween, the sealed jacket 11 accommodating the electrode assembly with the non-aqueous organic electrolytic solution.

1 Claim, 5 Drawing Sheets

(56) References Cited

U.S. PATENT DOCUMENTS

2013/0260214 A1* 10/2013 Ueda ................. H01M 10/0585
  429/162
2013/0295449 A1* 11/2013 Kobatake ............... H01G 11/62
  429/200

* cited by examiner

LAMINATED LITHIUM PRIMARY BATTERY

CROSS-REFERENCE TO RELATED APPLICATIONS

The present application claims priority from Japanese Patent Application No. 2015-19301 filed on Feb. 3, 2015, which is herein incorporated by reference.

BACKGROUND

Technical Field

The invention relates to a laminated lithium primary battery in which the jacket made of laminate film accommodates an electrode assembly, the electrode assembly including negative electrode made of lithium.

Related Art

In recent years, various sheet-like thin electronic devices in which power sources are included are in practical use; for example, electronic papers, Integrated Circuit tags (IC tags), Integrated Circuit cards (smart cards), and electronic key cards. As power sources for these devices, there are laminated lithium primary batteries, which are suitable to be made small and thin. FIGS. 1A and 1B show the basic construction of a laminated lithium primary battery 1. FIG. 1A is an external view of the laminated lithium primary battery 1, and FIG. 1B is an exploded perspective view illustrating the internal construction of the battery 1. In FIG. 1B, some of parts are hatched so as to distinguish them over the other parts. The laminated lithium primary battery 1 has a flat external shape, as shown in FIG. 1A. On one side of a flat, rectangular jacket 11 made of laminate film, a positive terminal plate 23 and a negative terminal plate 33 reach outside of the jacket 11 from the inside of the jacket 11.

As shown in FIG. 1B, the jacket 11 is formed by heat-sealing the periphery of two laminate films (11a and 11b), and an electrode assembly 10 is arranged inside the heat-sealed frame (hereinafter referred to as a sealed part 50); the electrode assembly 10 being formed by stacking a sheet-like positive electrode 20, a sheet-like negative electrode made of lithium (hereinafter referred to as negative electrode lithium 30) and a separator 40 interposed between them. The electrode assembly 10 is enclosed inside the jacket 11 together with electrolytic solution in which non-aqueous organic solvent is used (hereinafter referred to as non-aqueous electrolytic solution).

As shown in drawings, a direction in which the positive electrode 20, the separator 40, and the negative electrode 30 are stacked is defined as an up-and-down direction and the side of the positive electrode 20 in the electrode assembly 10 is defined as "up". More specifically, the positive electrode 20 is made by applying cathode material 22 in slurry form to a surface of a cathode current collector 21 (made of metal foil, etc.) and drying it. In this example, a strip-like projection is formed in an integrated manner with the cathode current collector 21, and the tip end of the projection reaches outside of the jacket 11. A part of the jacket 11 which is exposed outside is the positive terminal plate 23. To the lower surface of the negative electrode lithium 30, a strip-like metal plate 31 is attached, and a part of the metal plate 31 reaches outside of the jacket to form the negative terminal plate 33. Though the laminated lithium primary battery 1 including a single electrode assembly 10 is described above as an example, a plurality of electrode assemblies 10 may be stacked in the up-and-down direction depending on the output voltage required by external devices, battery capacity, or the like.

A battery (such as a lithium primary battery) having high operating voltage and including combustible non-aqueous electrolytic solution needs, regardless of the construction of the jacket, safety measure specific to rise in the temperature inside the battery. In a lithium primary battery, a separator made of resin material (e.g. polyethylene) is used, and the resin material has a shutdown function to interrupt current between the positive electrode and the negative electrode by melting at high temperature. The following Non Patent Literature 1 describes safety and evaluation criteria of a battery including non-aqueous electrolytic solution, shutdown function of its separator, and the like.

[Non Patent Literature 1] NTT Facilities Research Institute Inc., "Internal Short Circuit in Lithium-ion Batteries and Safety Testing", [online], [search result on Jan. 22, 2015], Internet <URL:https://www.ntt-fsoken.co.jp/research/pdf/2007_ichi.pdf>

As well known, lithium actively reacts with moisture to release heat. And, moisture is more likely to penetrate from outside into a battery whose jacket is made of laminate film, such as a laminated lithium primary battery, than into a battery in which a metal can is used. A separator having shutdown function has been, therefore, essential for laminated lithium primary batteries.

When lithium reacts with moisture, lithium hydroxide is produced. In the lithium primary batteries, this lithium hydroxide will worsen battery life and dischargeable capacity. In addition, in the laminated lithium primary batteries, its negative electrode lithium is in the form of thin foil and the amount of lithium itself is small. And therefore, battery life will more significantly deteriorate even if a little lithium hydroxide is produced.

Concerning increase in capacity, there is greater demand for laminated lithium primary batteries than for other types of batteries. For example, there is a thin expendable electronic device, such as a smart card, which has an expiry date and will be used for several years, and if laminated lithium primary batteries are used in the foregoing electronic device, it is necessary to securely output stable operating voltage for a long period. But, in a case of a smart card, whose external size is specified by standard, it is impossible to enlarge the external size of its laminated lithium primary battery. Accordingly, a space to accommodate an electrode assembly is provided by enlarging the area of the electrode assembly and narrowing the width of a sealed part. But, narrowing the width of sealing worsens the sealing quality of laminate film, and consequently moisture is more likely to penetrate. In order to realize both good sealing quality and large capacity, it can be reasonably considered that laminate film is welded with a narrower sealing width at higher temperature and higher pressure. But, it has been found that welding the laminate film at a higher temperature than in conventional batteries causes deterioration of shutdown function.

An advantage of the invention is to provide a laminated lithium primary battery which makes it possible to prevent battery life deterioration caused by moisture penetration from outside, and in which safety and increase of battery capacity both can be realized.

SUMMARY

An aspect of the invention to achieve the above advantage is a laminated lithium primary battery, including: a sheet-like negative electrode made of lithium; a sheet-like positive electrode; a sheet-like separator made of cellulose; non-aqueous organic electrolytic solution; a jacket made of laminate film, an inside of the jacket is sealed by heat-sealing a periphery of the laminate film stacked in an up-and-down direction; and an electrode assembly in which the positive electrode and the negative electrode are stacked in the up-and-down direction having the separator therebetween, the sealed jacket accommodating the electrode assembly with the non-aqueous organic electrolytic solution. In such a laminated lithium primary battery, an amount of water in the jacket may be between 300 ppm and 1000 ppm inclusive.

With a laminated lithium primary battery according to the invention, it is possible to prevent battery life deterioration caused by moisture penetration from outside, and also safety and increase of battery capacity both can be realized. Effects of the invention other than the above will become clear by the description hereinbelow.

DESCRIPTION OF EXEMPLARY EMBODIMENTS

The embodiment of the invention will be described below with reference to the accompanying drawings. In the description below, the same or similar items will be indicated by the same symbols and duplicate descriptions will be often omitted.

Process to the Invention

As mentioned above, in a laminated lithium primary battery having negative electrode lithium, it is difficult to combine increase of its battery capacity with good sealing quality of its jacket. In the course of the inventors' research for realizing a laminated lithium primary battery having a larger capacity and an improved sealing quality, the inventors have found the following: many types of laminated lithium primary batteries, which are embedded as a power source into electronic devices like smart cards, include an electrode assembly; and in a laminated lithium primary battery having such an electrode assembly, heat produced in the battery is immediately transferred to the jacket and is quickly released. Accordingly, the inventors have shifted their focus to a technical idea of ensuring safety while using a separator made of material which does not have shutdown function, from a conventional idea of improving sealing quality while maintaining shutdown function by a separator. The invention has been realized as a result of diligent researches based on the foregoing consideration.

Embodiment

Figure 1A:
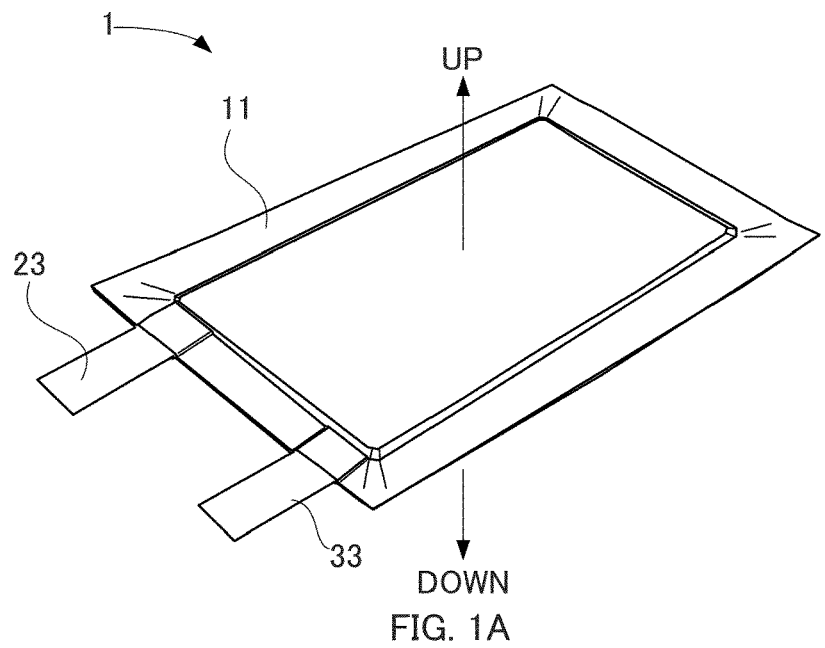
FIG. 1A is a diagram showing an external view of the construction of a common laminated lithium primary battery.
Figure 1B:
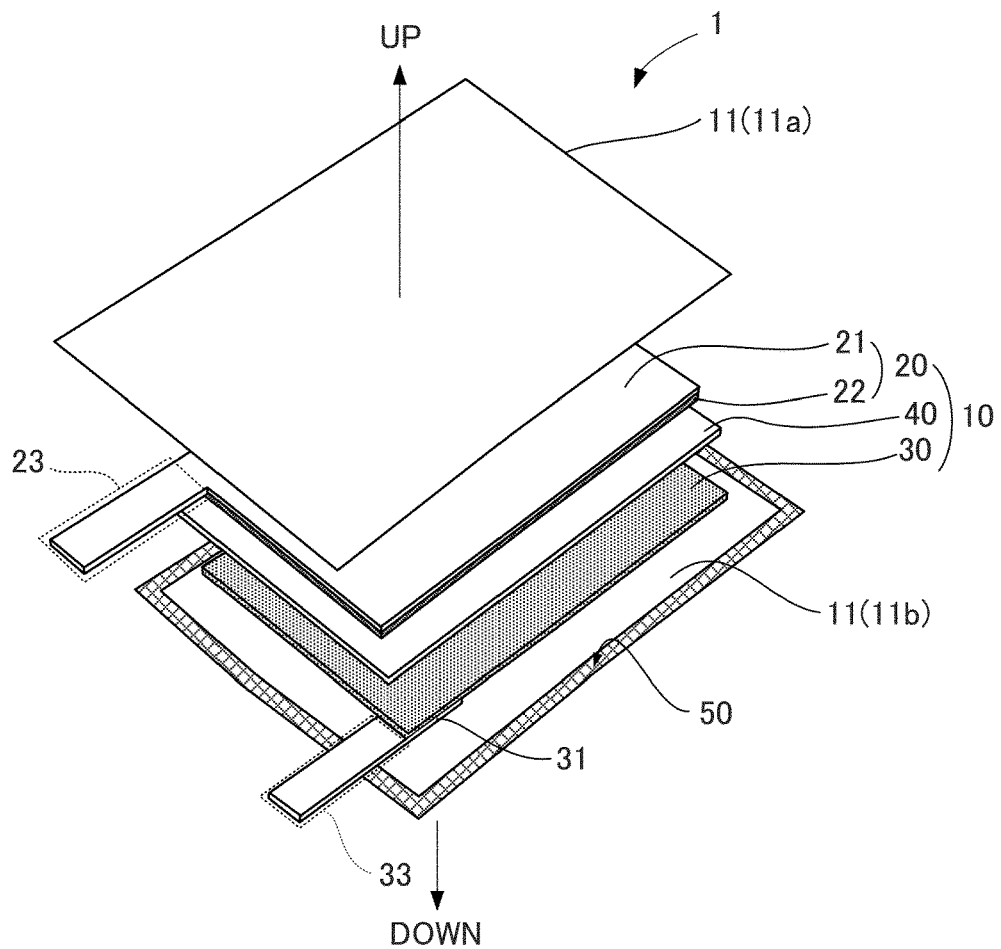
FIG. 1B is a diagram showing an exploded perspective view illustrating the internal construction of a common laminated lithium primary battery.

The construction of a laminated lithium primary battery according to the embodiment of the invention is the same as that of the battery shown in FIGS. 1A and 1B, which includes an electrode assembly 10. But, the laminated lithium primary battery according to the embodiment is characterized in that cellulose is used as the material of a separator 40. Cellulose is made from vegetable fiber and does not have shutdown function unlike resin such as polyethylene, polypropylene, or the like, which are conventional materials of separators for laminated lithium primary batteries. That is, it is unnecessary in principle to consider deterioration of shutdown function.

Of course, if the use of a separator made of cellulose (hereinafter referred to as a cellulose separator) worsens safety and battery performance, it is undesirable in practical use. In order to evaluate performances of a laminated lithium primary battery according to the embodiment of the invention, the following sample batteries were prepared and various tests were performed for them: laminated lithium primary batteries each having a cellulose separator; and laminated lithium primary batteries each having a conventional separator made of resin material (hereinafter referred to as a resin separator) (e.g. nonwoven fabric made of polypropylene).

Procedure for Preparing Samples

The basic constructions and configurations of the samples are identical to those of the battery shown in FIGS. 1A and 1B except for the material of their separators. The procedure for preparing the samples will be described below with reference to FIGS. 1A and 1B. First, a positive electrode 20 is made by applying cathode material 22 in slurry form to a surface of a cathode current collector 21 and drying it. The cathode current collector 21 is made of aluminum foil having a thickness of 10-30 μm, and the cathode material 22 is a mixture of electrolytic manganese dioxide (EMD: serving as a cathode active material), carbon black (serving as electro-conductive substance) and a binder (a fluorine-based binder and the like) in a predetermined ratio (e.g. EMD: electro-conductive substance: binder=93 wt %: 3 wt %: 4 wt %). A negative electrode lithium 30 is a thin sheet made of lithium. Onto the lower surface of the lithium sheet, a tab 33 is provided by attaching a strip-like metal plate 31 by means such as welding. The positive electrode 20 and the negative electrode 30 face each other and are stacked having a separator 40 therebetween to form an electrode assembly 10.

The electrode assembly which has been assembled by the foregoing procedure is sandwiched between two sheets of rectangular laminate film (11a and 11b). At this stage, the positive and negative terminal plates (23 and 33) protrude outwardly beyond the sheets of laminate film (11a and 11b). Then, three sides of two sheets of laminate film (11a and 11b), which are stacked with the electrode assembly 10 being sandwiched therebetween, are heat-sealed and joined, and the sheets are shaped into the form of a bag. Electrolytic solution is injected into the laminate film which is in the form of a bag. The electrolytic solution is, for example, a well-known three-component non-aqueous solution in which the proportion of propylene carbonate (PC), ethylene carbonate (EC), and 1,2-dimethoxyethane (DME) is the volume ratio of 20 vol %: 20 vol %: 60 vol %, and in which lithium trifluoromethanesulfonate ($LiCF_3SO_3$) is dissolved in this solvent to a concentration of 0.8 mol/l, the lithium trifluoromethanesulfonate serving as a supporting electrolyte.

Figure 2:
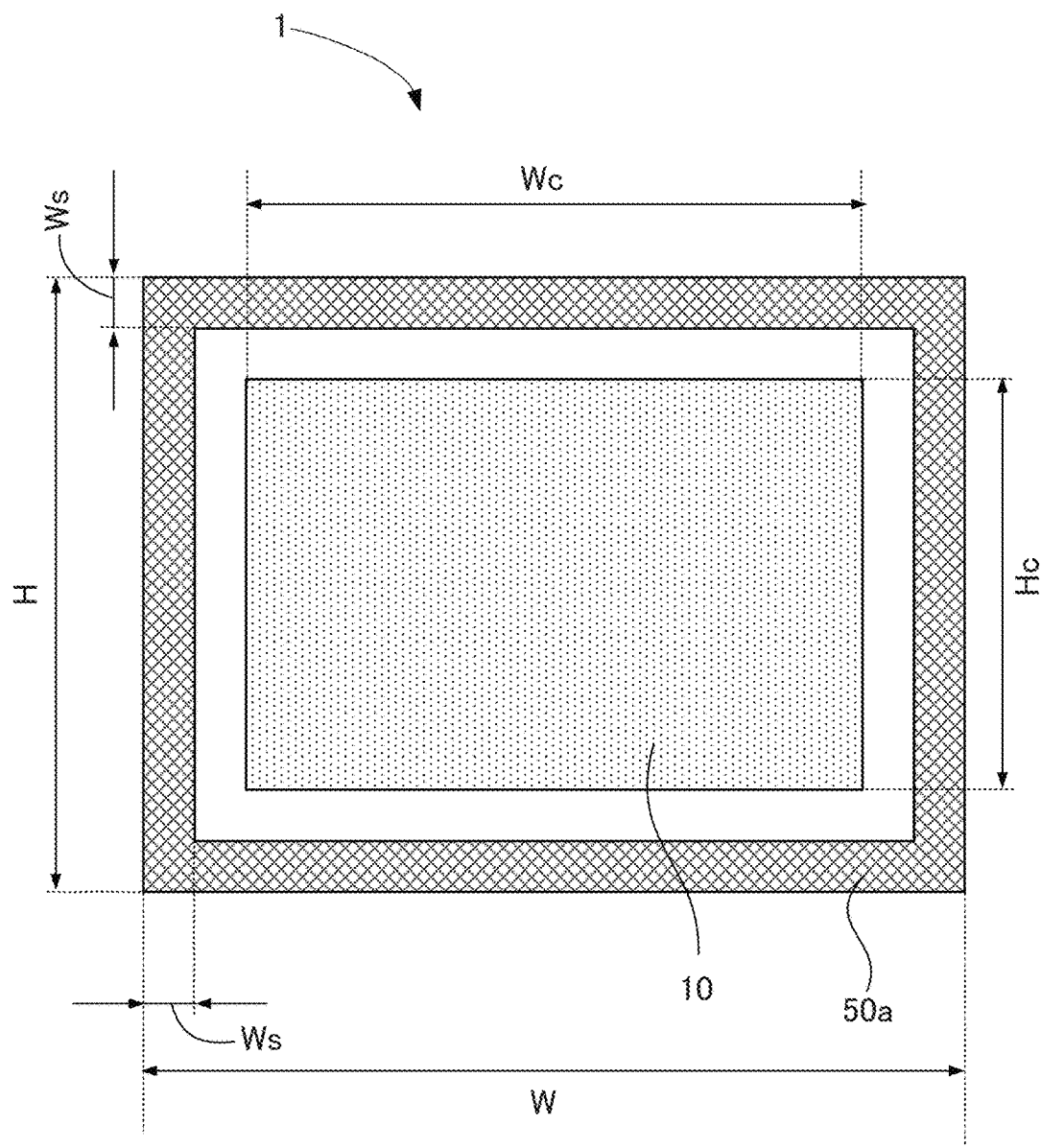
FIG. 2 is a diagram illustrating the sizes of parts in a laminated lithium primary battery according to the embodiment of the invention and in a laminated lithium primary battery according to a comparative example.

After the electrolytic solution is injected into the laminate film (11a and 11b) which is in the form of a bag, the opening of the baglike laminate film (11a and 11b) is heat-sealed to produce a sample. All samples are produced under the same heat-sealing conditions (temperature and pressure). FIG. 2 shows a diagram illustrating the sizes of parts in a sample. In FIG. 2, the terminal plates (23 and 33) shown in FIGS. 1A and 1B are omitted. In the prepared samples, the jacket 11 has external dimensions: width W=30 mm; and height H=25 mm. The electrode assembly 10 has external dimensions: width Wc=22 mm; and height Hc=17 mm. The sealed part 50 has external dimensions: width Ws=3 mm.

Evaluation of Performances
Safety

Figure 3:
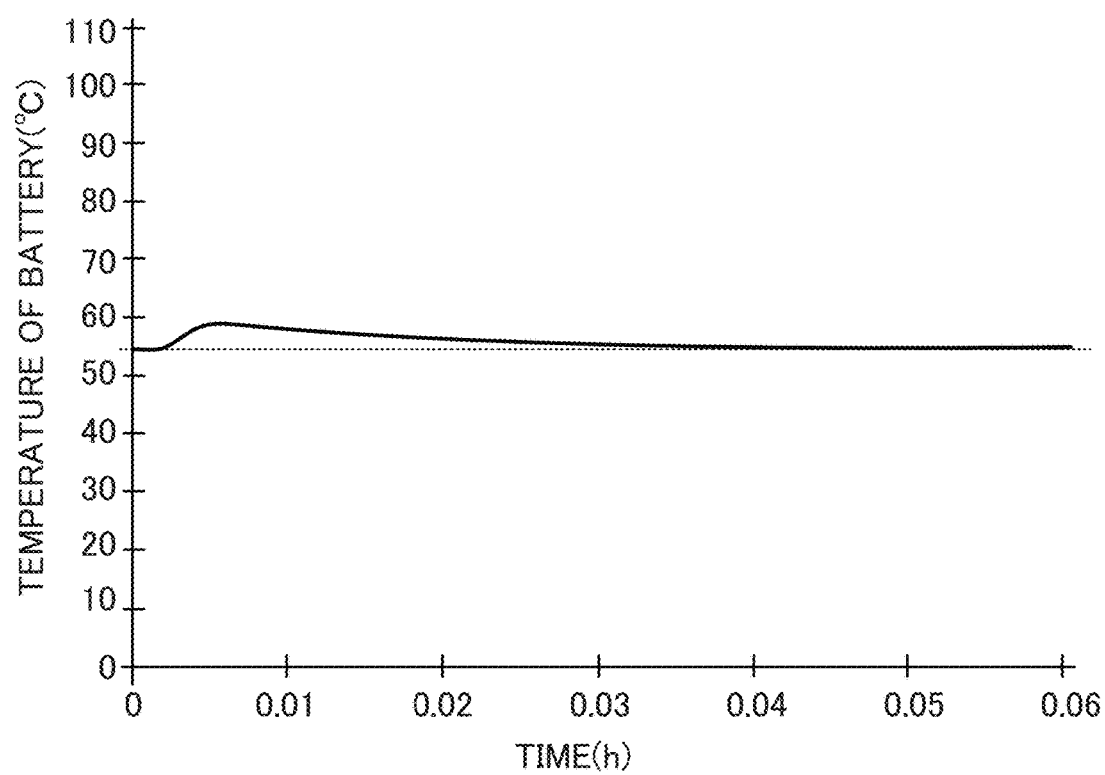
FIG. 3 is a graph showing a result of an external short circuit test of the embodiment.

Many samples were prepared according to the foregoing procedure. Concerning the samples including a resin separator (hereinafter referred to as the comparative example), an internal short circuit occurred in 30% of the total number n of those samples (e.g. n=10). It can be considered that the short circuits have been caused by shrinkage of their own separators, the shrinkage being due to the heat produced when heat-sealing the laminate film. That is, shutdown function for preventing an internal short circuit upon heating deteriorates. On the other hand, concerning the samples including a cellulose separator (hereinafter referred to as the embodiment), an internal short circuit did not occur in any of the samples. And, for the samples according to the embodiment, an external short circuit test (UN/DOT T5) was performed at a temperature of 55° C. In the cases of a normal resin separator, the temperature of each of the samples did not rise to approximately 110° C., at which shutdown function activates. FIG. 3 shows a result of the external short circuit test. Though the surface temperature of the battery rose only immediately after starting the external short circuit test, the temperature fell to the test temperature (55° C.) for a short time, and thereafter was kept constant at the test temperature. That is, it has been confirmed that, in a battery using a cellulose separator, which does not have shutdown function, internal heat is sufficiently released outside if the battery include only one electrode assembly. Accordingly, in a laminated lithium primary battery having only one electrode assembly, the use of the cellulose separator makes it possible to realize both good sealing quality and increase of battery capacity.

Amount of Water-In-Battery

The laminated lithium primary battery needs a great sealing strength in order to prevent moisture penetration from outside; moisture actively reacts with negative electrode lithium. It is also necessary to strictly limit moisture contained in the electrode assembly and the electrolytic solution of the battery itself. In the laminated lithium primary battery according to the embodiment, a cellulose separator is used. As well known, such a cellulose separator has a higher water retention than that of a resin separator. It is therefore required to sufficiently dry a cellulose separator which is used in a laminated lithium primary battery before assembling the battery. Generally speaking, in order to dry a separator having a high water retention, it is necessary to heat it under vacuum for a sufficiently long time. Accordingly, even if a laminated lithium primary battery including a cellulose separator has a sufficient safety, the battery is undesirably expensive in production cost.

And, the amounts of water contained in batteries of the embodiment and batteries of the comparative example (hereinafter referred to as amounts of water-in-battery) were measured. Specifically speaking, for each of the same separators and the same electrolytic solutions as those which are included in the samples of the embodiment and the samples of the comparative example, amount of water per unit weight is measured by well-known Karl Fischer method. And, it can be considered that most of moisture brought in a battery is moisture in the separator because moisture in the electrolytic solution is almost completely removed by vacuum deaeration. If the amount of water-in-battery after assembling the battery is needed to be measured, the amount of water-in-battery can be obtained by measuring the amount of water in the electrolytic solution because moisture in its separator leaches into the electrolytic solution.

<Method for Drying Separator and Amount of Water>

In the resin separator of the comparative example, most moisture can be removed if material to be the resin separator (nonwoven fabric made of resin) is stored in dry air, for example, in a dry room. In fact, the resin separators of the comparative example were dried in such a method. In the comparative example, the amounts of water-in-battery were extremely small (not more than 50 ppm).

On the other hand, in batteries according to the embodiment, since it is necessary to dry their cellulose separators having a high water retention, material to be the cellulose separators was dried for 5 hours at a temperature of 130° C. in air. It is, however, found that those batteries according to the embodiment still contain a moisture of about 300 ppm. The cellulose separators which were dried in the same method as the foregoing resin separators contain a moisture of about 600 ppm. It is possible for the separators to contain a moisture of about 1000 ppm if the separators are forced to absorb moisture by storing the separators, not in dry air, at a higher humidity than in air. Accordingly, the moisture of a separator prepared in a common production procedure will not exceed 1000 ppm.

Figure 4:
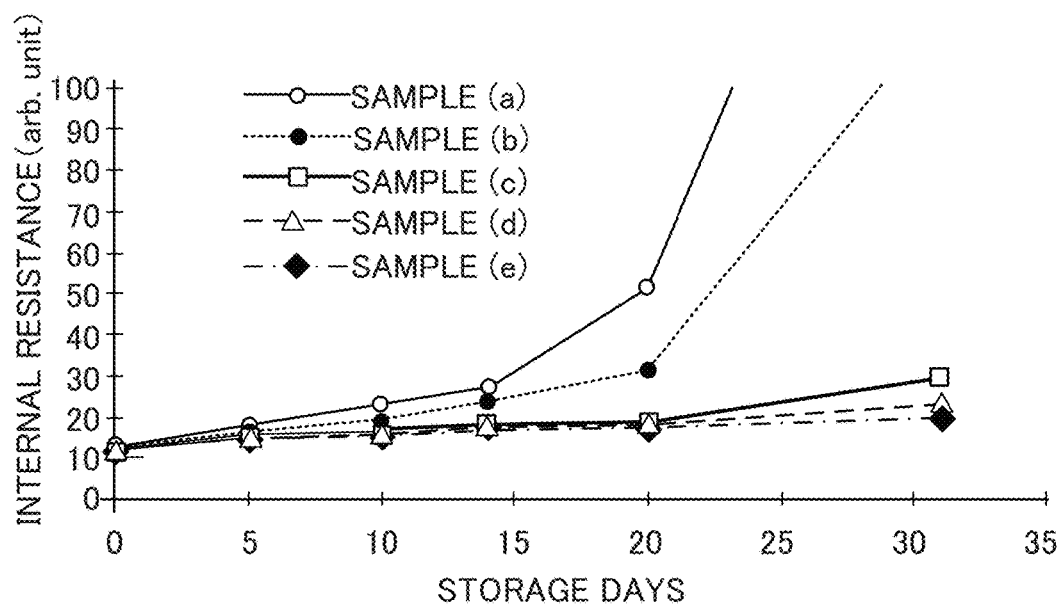
FIG. 4 is a graph showing a relation between elapsed days and internal resistance in a reliability test of the embodiment and the comparative example.

Next, for samples according to the comparative example and samples according to the embodiment, reliability test, in which those samples are stored at a high temperature of 60° C. and high humidity of 80% RH, was performed to examine change in internal resistance and in dischargeable capacity. As for the samples according to the comparative example, resin separators which were dried in the foregoing dry air were used and the amounts of water-in-battery of them were equal to or less than 50 ppm. As for the samples according to the embodiment, cellulose separators which were dried in a different method were used and the amounts of water-in-battery of them were different in a range from 300 ppm to 1000 ppm. FIG. 4 is a graph showing a relation between storage days and internal resistance at high temperature and high humidity, and the internal resistance is indicated in arbitrary unit (arb. unit) in which the value at the time of starting the test is defined as 10. In FIG. 4, samples (a) and (b) are both laminated lithium primary batteries according to the comparative example were prepared under the same conditions, and the their amounts of water-in-battery are equal to or less than 50 ppm. Among the samples according to the comparative example, the sample (a) is one in which the increase in internal resistance was greatest, and the sample (b) is one in which the increase in internal resistance was smallest.

FIG. 4 also shows a result of reliability test of samples (c) to (e), which are selected among the samples according to the embodiment as samples having typical characteristics. The sample (c) is one in which the increase in internal resistance was greatest, the sample (e) is one in which the increase was smallest, and the sample (d) is one in which the increase in internal resistance is in the middle of between the sample (c) and the sample (e). As shown in FIG. 4, in the samples (a) and (b) according to the comparative example, internal resistance increased greatly with storage days, and the value of the resistance exceeded 10 times the initial value before 30 days had passed. In addition, the samples (a) and (b) both had an extremely low amount of water-in-battery of 50 ppm, but their trends in internal resistance increase were remarkably different. On the other hand, in the samples (c) to (e) according to the embodiment, their internal resistances had reached to approximately twice their initial values after 30 days had passed from the start of the reliability test. The trends of the samples (c) to (e) in internal resistance increase are almost the same.

Figure 5:
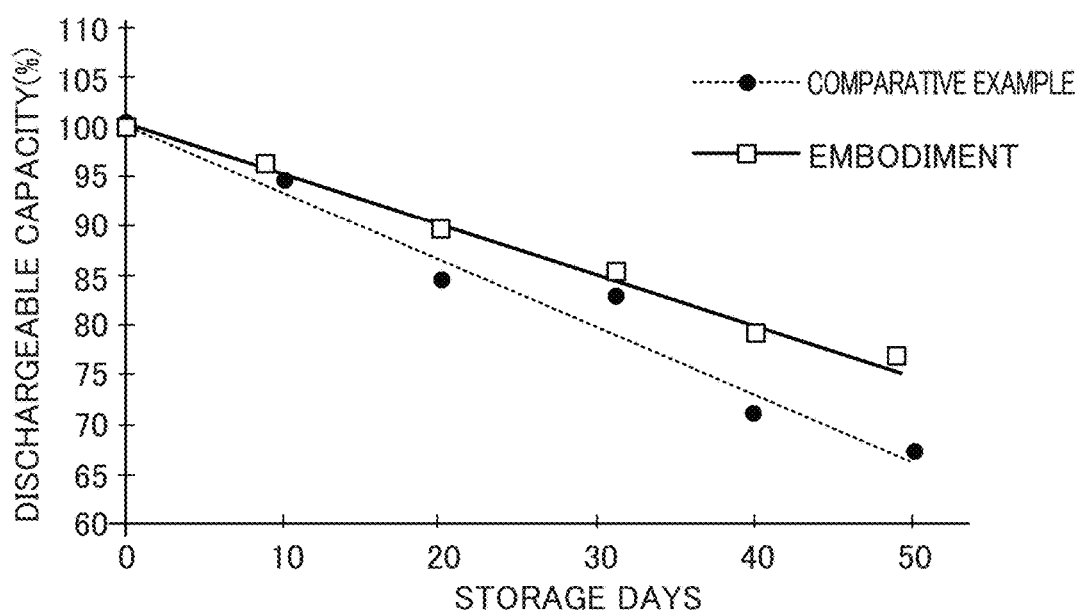
FIG. 5 is a graph showing a relation between elapsed days and dischargeable capacity in the reliability test of the embodiment and the comparative example.

FIG. 5 is a graph showing a relation between storage days and dischargeable capacity at high temperature and high humidity mentioned above. The embodiment shown in FIG. 5 corresponds to a sample having an amount of water-in-battery of 1000 ppm. As shown in FIG. 5, the samples according to the embodiment less decreased in dischargeable capacity than those of the comparative example. Accordingly, it has been found that a laminated lithium primary battery including a cellulose separator has an excellent reliability nevertheless of its considerably large amount of water-in-battery. In the laminated lithium primary battery according to the embodiment, it is possible to simplify a process for drying its cellulose separator, and this allows the battery to be provided more inexpensive.

Figure 6A:
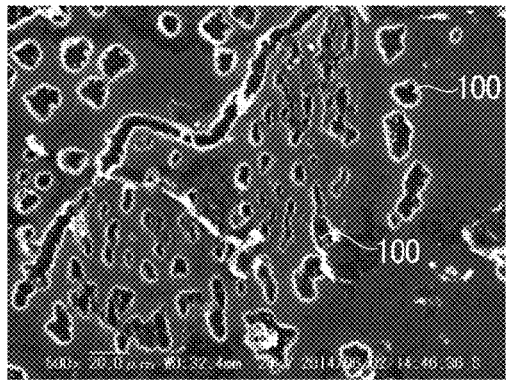
FIG. 6A is an electron micrograph at a magnification of 500 showing the surface of the negative electrodes of a battery in the comparative example after the reliability test.
Figure 6B:
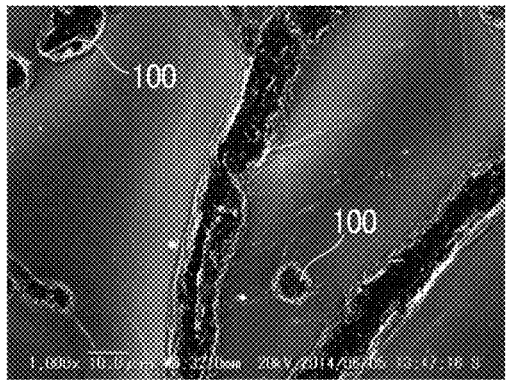
FIG. 6B is an electron micrograph at a magnification of 1000 showing the surface of the negative electrodes of a battery in the comparative example after the reliability test.
Figure 6C:
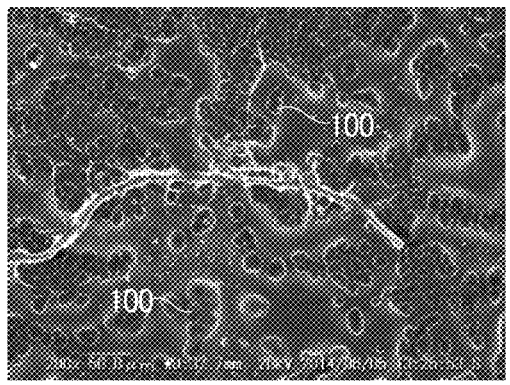
FIG. 6C is an electron micrograph at a magnification of 500 showing the surface of the negative electrodes of a battery in the embodiment after the reliability test.
Figure 6D:
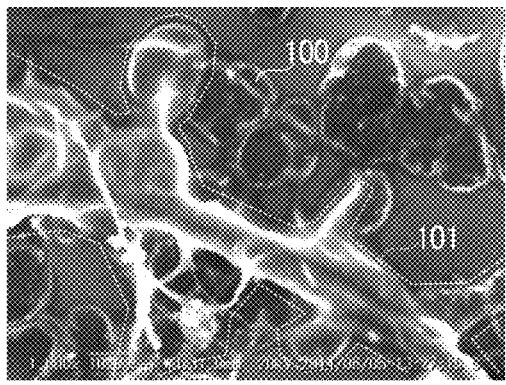
FIG. 6D is an electron micrograph at a magnification of 1000 showing the surface of the negative electrodes of a battery in the embodiment after the reliability test.

Incidentally, a battery having an amount of water-in-battery of 1000 ppm should not work as a battery, but a laminated lithium primary battery according to the embodiment having such an amount of water-in-battery sufficiently operates. In the reliability test, moisture of the same amount penetrates from outside into the samples of the embodiment and the samples of the comparative example both of which were prepared under the same sealing condition. However, obviously, in the samples of the embodiment, internal resistance less increases and dischargeable capacity less deteriorates than in the samples of the comparative example. After the reliability test, the samples respectively according to the comparative example and the embodiment are disassembled, and the surfaces of the negative electrode lithiums on the separator side were observed by an electron microscope. FIGS. 6A, 6B, 6C, and 6D show electron micrographs of the negative electrode lithiums of samples in the comparative example and the embodiment. FIGS. 6A and 6B show the surfaces of negative electrode lithiums in the comparative example, and FIGS. 6C and 6D show the surfaces of negative electrode lithiums in the embodiment. FIGS. 6A and 6C are photographs taken at a magnification of 500, and FIGS. 6B and 6D are photographs taken at a magnification of 1000. As shown in FIGS. 6A and 6B, in the comparative example, it is confirmed that a granular structure like crystal grains (hereinafter referred to as a crystal grain 100) existed on the surface of the negative electrode lithium. On the other hand, as shown in FIGS. 6C and 6D, in the embodiment, it is confirmed that the surface of the negative electrode lithium was covered with slightly milky coating. In FIG. 6D, there is a fibrous area 101 in which the coating can be seen more apparently. Thus, it can be considered as follows. In the laminated lithium primary battery according to the embodiment, substance which is to serve as coating is produced in an area of the negative electrode lithium where the electrode is in contact with cellulose fiber. And, the coating maintains conductivity and interrupts contact of the negative electrode lithium with moisture. The coating can be considered to be lithium alkoxide which has been produced by reaction of hydrogen bond of cellulose with the negative electrode lithium, the cellulose constituting the separator, the negative electrode lithium being a powerful reducing agent. In the laminated lithium primary battery, the negative electrode lithium is in the form of thin foil and the amount of lithium itself is small. It can be therefore considered that a small amount of the foregoing coating is sufficient to cover the surface of negative electrode lithium so that it is possible to effectively interrupt contact of negative electrode lithium with moisture and to prevent the production of lithium hydroxide.

Other Embodiments

In the foregoing embodiment, the inside of the jacket is sealed by heat-sealing four peripheral sides of the two sheets of laminate film stacked in the up-and-down direction. However, the inside of the jacket may be sealed by heat-sealing three open sides of a two-folded sheet of laminate film which is stacked in the up-and-down direction. It is sufficient that the jacket is one in which the periphery of laminate film stacked in the up-and-down direction are heat-sealed in any manner.

What is claimed is:
1. A laminated lithium primary battery, comprising:
 a sheet-like negative electrode made of lithium;
 a sheet-like positive electrode;
 a sheet-like separator made of only cellulose, and being in contact with the lithium;
 non-aqueous organic electrolytic solution;
 a jacket made of laminate film,
  an inside of the jacket is sealed by heat-sealing a periphery of the laminate film stacked in an up-and-down direction; and
 an electrode assembly in which the positive electrode and the negative electrode are stacked in the up-and-down direction having the separator therebetween,
  the sealed jacket accommodating the electrode assembly with the non-aqueous organic electrolytic solution, wherein an amount of water in the jacket is between 300 ppm and 1000 ppm inclusive.

* * * * *